United States Patent Office.

IMPROVED PROCESS OF TANNING.

JULIUS A. PEASE, OF NEW YORK, N. Y.

Letters Patent No. 60,549, dated December 18, 1866.

---

The Schedule referred to in these Letters Patent and making part of the same.

---

TO ALL WHOM IT MAY CONCERN:

Be it known that I, JULIUS A. PEASE, of the city, county, and State of New York, have invented a new Process of Tanning; and I do declare the following to be a full description of the same.

The nature of my invention consists in using the extract of logwood.

To enable others skilled in the art to use my invention, I will proceed to describe the operation: I dissolve, say, one pound of the extract in about two pails full of water, which makes a very strong liquor. In this I place my skins and let remain until tanned—for a calf-skin about three days, which, by the usual process, takes about six weeks. The liquor costs less than the bark liquors generally used. I know that the extract of logwood has been used to color skins after they were tanned; I do not claim that.

What I do claim, and desire to secure by Letters Patent, is—

The use of the above-mentioned material for tanning, either alone or in combination with other materials, substantially as above described.

JULIUS A. PEASE.

Witnesses:
   J. B. NONES,
   JAS. A. BREWSTER.